Jan. 12, 1954      J. W. SAWYER      2,665,929
SHAFT SEALING DEVICE

Filed Sept. 10, 1948      2 Sheets-Sheet 1

INVENTOR.
JOHN W. SAWYER
BY
ATTORNEY

Jan. 12, 1954

J. W. SAWYER 2,665,929

SHAFT SEALING DEVICE

Filed Sept. 10, 1948

INVENTOR.
JOHN W. SAWYER
BY
ATTORNEY

Patented Jan. 12, 1954

2,665,929

UNITED STATES PATENT OFFICE 2,665,929

SHAFT SEALING DEVICE

John W. Sawyer, Arlington, Va.

Application September 10, 1948, Serial No. 48,549

6 Claims. (Cl. 286—9)

(Granted under Title 35, U. S. Code (1952), sec. 266)

This invention relates to sealing apparatus for shafts and the like with particular application to the protection of turbines, centrifugal pumps, generators and other expensive equipment as used in ships or land based installations. Because of high utility on shipboard the description will be directed to this field of use.

In ship operation conditions may arise where flooding occurs in chambers where expensive and complex equipment using rotating members is installed. In such installation it is important that the shaft connection to the supporting casings be sealed for fluid passage and that this seal be effective not only during shaft rotation but also under static conditions. It is further of importance that the operation of the seal be sensitive and positive, free of high friction losses, and independent of the nature of the sealing substance.

Heretofore, seal apparatus has been used in which operation is dependent on the density of a fluid subject to centrifugal action; consequently proper functioning is related to the fluid used. Moreover, in prior art devices, friction losses, affecting life of parts and speed of operation, is a problem.

Briefly stated, the invention comprises seal apparatus applicable between stationary and rotating parts including an annular member fixed to the rotating element, such as a shaft, and formed with a V-section channel opening toward the shaft. Included also is a flow material such as heavy liquid adapted to lie in the channel and distribute itself therein by centrifugal action. Additionally an annular stationary ridge enters the liquid normally when the shaft is rotating to form the moving seal. The walls of the liquid channel engage the stationary ridge holding member yieldably when the shaft is stationary but diverge under the action of centrifugal force to eliminate friction losses. This diverging action is primarily dependent on the mass of the channel walls as subject to centrifugal force and consequently is independent of the pressure of the channel liquid.

It is an important object of the present invention to provide a shaft seal which operates independently of the nature of the sealing material. Another object is to provide a shaft sealing construction wherein the friction losses are relatively low. An object also is to provide a sealing mechanism which is highly sensitive to control conditions. An important object involves provision of control means which develop a positive force movement on the sealing valve mechanism. Additional objects are the provision of means for testing sealing liquid losses both during and between periods of shaft rotation and for supplying sealing liquid to the sealing connection only when leakage to a predetermined pressure develops in the chamber.

Other objects and many of the attendant advantages of this invention will be readily appreciated as the same becomes better understood by reference to the following detailed description when considered in connection with the accompanying drawings wherein—

Figure 1:
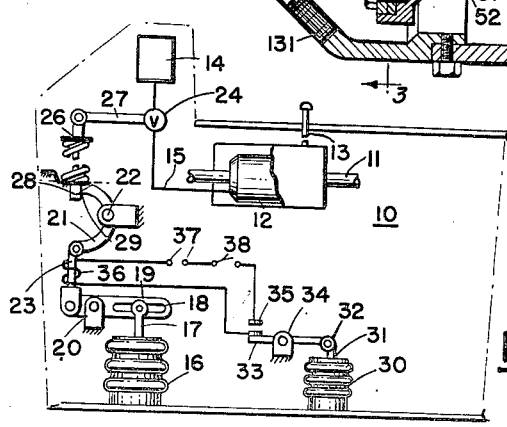
Fig. 1 is a view illustrating an application of the apparatus.

In Fig. 1 there is shown a ship chamber or compartment 10 in which a shaft 11 is positioned for rotation. Shaft 11 may be the main propeller shaft or it may be any power shaft of the ship equipment associated with electric motors, generators, turbines and the like. Such equipment is subject to rapid deterioration and injury on water flooding and it is important that immersion either be prevented or delayed, where prevention is impossible.

Enclosing a section of the shaft 11 is a casing 12 within which is the equipment for which protection is desired. An air outlet 13 for gas pressure equalization is led to a point external to the casing and chamber 10.

A reservoir 14 for sealing material is indicated from which, by means of tubing 15, the appropriate sealing material is supplied the seal mechanism as needed. While gases or powders are usable as sealing materials ordinarily a heavy liquid such as mercury is used. To permit automatic feed of the seal liquid I have disclosed pressure sensitive devices which are placed on the floor of the chamber and which function to operate a valve in the liquid supply line when leakage into the chamber develops a predetermined pressure on these devices. By way of example, a compressible bellows-walled drum 16 is mounted on the base of chamber 10 with a stem 17 attached to the movable face of the drum. The free end of the stem is provided with a pin movable in a slot 18 of the lever arm 19. The arm is pivoted on a fixed support at 20 and operates a hooked member 21 pivoted at 22, through a connecting link 23. The valve 24, in supply line 15 from reservoir 14, is normally closed but is opened by release of a spring rod 26 which in turn is pivotally connected to the valve link 27. A detent recess 28 in spring rod 26 is normally engaged by the detent 29 at the end of hooked member 21. Release of the detent 29 permits the rod 26 to move upwardly to open valve 24, and the supply line, to the flow of sealing liquid.

Electrical valve control means are also shown which may be used alternatively or simultaneously with the mechanism above described. While the bellows 16 could also be used for this control it is preferable for most uses to employ a second bellows drum 30 mounted on the floor of the ship chamber and having a pivot stem 31 provided with a pivot terminal 32, connected to the contact arm 33. This arm is pivoted at 34, and movement of the drum 30 makes and breaks contacts 35 in a circuit including electromagnet 36, power source 37 and normally closed manual switch 38. The link 23 includes the core of electromagnet 36 so that on closure of contacts 35 and energization of electromagnet 36, detent 29 is released to bring about opening of supply line valve 24.

While the bellows units 16 and 30 are shown attached to the base at a common level it is apparent that these units may be stepped so as to be operative at different levels. Alternatively, the bellows units may be constructed to operate at different pressures. In this way possibility of failure due to breakdown of either unit or abnormal development of resistance in either unit is reduced.

The sealing unit will now be described, reference being made specifically to Figures 2 and 3.

The shaft 11, which may be tubular or solid in section, passes into the end of the casing 12 which includes apparatus to be protected from flooding. A stub tubing 50 having an inner diameter substantially in excess of the shaft diameter is attached to the casing end in concentric relation to the shaft. An annular disc, ridge or flange 51 which may be integral with tubing 50 is positioned externally thereto. This flange may be of varied form but is preferably triangular in section in the form of an acutely angled wedge having a thin peripheral section 52 adjusted to enter the sealing liquid as will be now described.

Figure 4:
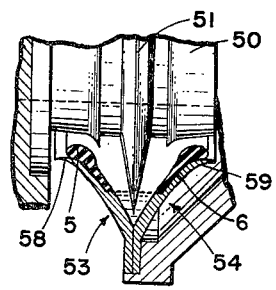
Fig. 4 is a view of the centrifugal element of Fig. 2 while the shaft is rotating.

Two similar but reversely formed circular channel sections 53 and 54 having angled attachment edges 55 and 56 are secured together as by screws 57 at the attachment edges. The body parts 58 and 59 of these channel sections diverge inwardly toward the shaft and from each other to form the channel 60 which is designed for reception of a sealing fluid. This channel is positioned directly external to the flange 51 so that the flange tip 52 closely underlies the channel base at the parts of junction of the channel sections and of greatest radial channel depth. The channel 60 is supported about the flange 51 by means of a partition plate 61 attached at one end to the channel edge 56 and at the other to the hub element 62 fixed to shaft 11. Accordingly, on rotation of the shaft the channel 60 is rotated about the stationary flange 51 and if a sealing liquid 63, such as mercury or heavy oil is within the channel at the level as shown in Fig. 2 centrifugal force due to shaft rotation will distribute the liquid in the form of an annular ring along the channel base to the new level as shown in Fig. 4. The radial dimension of the flange 51 is such that when the liquid is thus distributed along the channel base the peripheral section 52 is immersed therein to such an extent as to offer in conjunction with the radial centrifugal force on the liquid a substantial resistance to transverse flow of fluids from one side of the flange to the other.

It thus appears that for the condition of shaft rotation an effective seal is provided against fluid movement from a point without the casing to a point within.

To insure proper sealing against transverse fluid flow under static conditions the diverging plate sections 58 and 59 of the channel 60 are recessed on the opposing inner sides thereof to receive flexible rings 65 and 66. These rings are curved in cross section with an axially inclined inner bearing section 5 and an angled attachment section 6. The attachment sections 6 are secured about half way on the channel section widths. The rings are so formed as, normally, without shaft rotation, to engage the tubing 50 on either side of the flange 51, with, at the same time, a substantial displacement between the rings and the channel sections 58 and 59 at the peripheral areas thereof. The bearing section 5 may be graphite impregnated cloth or other self lubricating material, or alternately, the tube surface adjacent ring sections 5 may contain lubricants.

Under static conditions of zero shaft rotation, the sections 5 of the rings 65 and 66 bearing on the stationary element 50 yieldably engage the outer surface of tubing 50, to form a static seal against transverse fluid flow. On rotation of the shaft 11, however, beyond a predetermined minimum speed at or in excess of the speed at which the liquid seal 51—63 forms, the rings flex outwardly, as shown in Fig. 4, due to centrifugal force, and thus wear due to rotational friction is eliminated. Due to the inward extension of the channel sections 58 and 59 a rigid backing is afforded the flexible rings 65 and 66 so that uniform concentricity of mass is assured for all conditions of rotation.

Attention is directed to an outstanding feature of the invention in that the flexing of the rings 65 and 66 is due to centrifugal forces acting on the substantial mass of the ring material coupled with the axial displacement of the center of mass from the point of ring support. Thus, the flexing of the rings is independent of the centrifugal pressure of the channel fluid and is effective to break contact as soon as shaft rotation begins.

Hereinbefore, mention has been made of mechanism operative to supply sealing fluid to the sealing mechanism only on development of pressures at selected areas external to the casing due to predetermined level of liquid leakage. This is desirable in order to prevent friction losses and dissipation of sealing fluid without accomplishing useful work, i. e. prevention of fluid flow into the casing. Tubing 15 leading into the channel space 60 is provided for this purpose. It is desirable also to provide means for removing the liquid after supply to the sealing mechanism. This is accomplished by forming a radial conduit 70 in the flange 51 passing from a point in the peripheral flange section 52 to the space between the shaft and tubing 50. Preferably this point should be at the extreme boundary of the flange. This inner outlet is connected by tubing 71 to an appropriate outlet or the receptacle 72 with valve 73 interposed therebetween. Opening of valve 73 during shaft rotation empties the channel to the level of the inlet opening of conduit 70.

A duct in flange 51 leads through tubing 74 and valve 75 to a gage 76 by which the static and centrifugal pressures in the channel liquid may be determined. In this manner the adequacy of supply of sealing liquid as well as the effectiveness of a given speed of rotation of the shaft may be ascertained.

It is desirable under certain conditions of use to provide means for cooling the flange 52. To this end coolant circulation tubing 77 is secured to an annular notch 25 formed on a face of flange 52. Coolant is supplied from a suitable source under pressure. Also lubrication may be applied to the frictional areas between the tubing 50 and the flexible members 65 and 66 through conduits 78 to diminish heat evolvement at these areas. A thermocouple with appropriate indicator connections may be placed in contact with the fluid in channel 60 to keep the operator informed of temperature conditions therein. In addition, by tapping the sealing medium supply line with an air pressure connection at 67 and utilizing pressure gage 68, leakage under static conditions may be detected.

Figure 2:
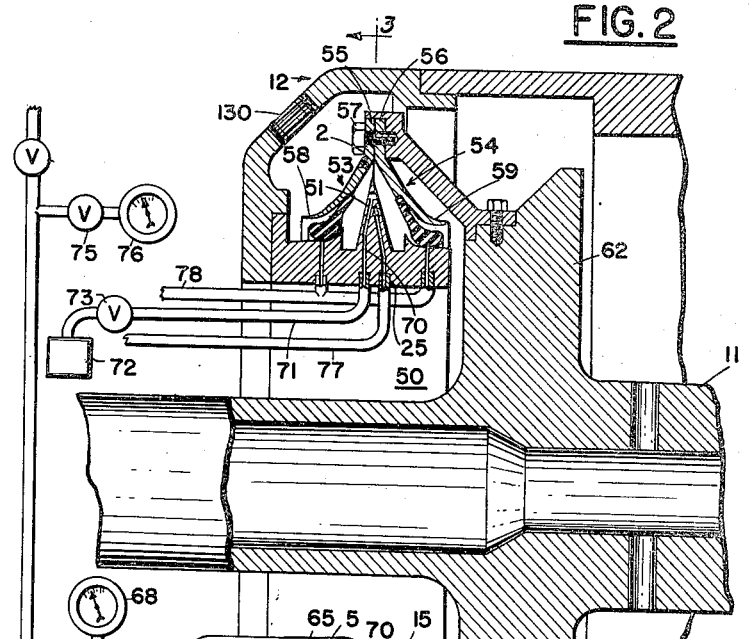
Fig. 2 is a sectioned detail showing the seal construction as applied to a shaft, the shaft being idle.
Figure 3:
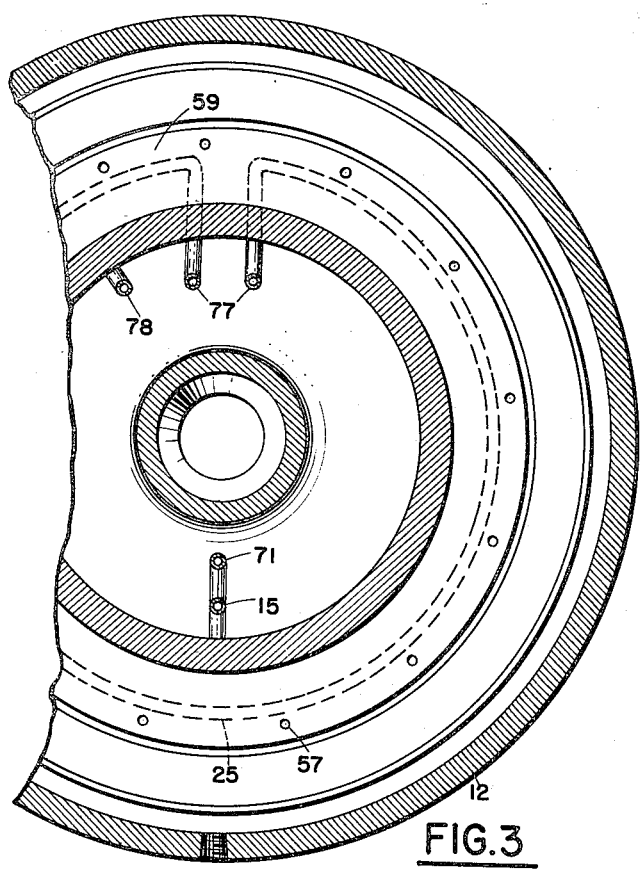
Fig. 3 is a section through the shaft unit of Fig. 2 along lines 3—3 thereof.

Alternative means of supply and withdrawal of sealing fluid is shown in Fig. 2 where duct 2 for supply and duct 3 for removal are indicated. These ducts are placed at the extreme edges of the converging walls forming channel 60 and access thereto is obtained by casing openings closed by plugs 130 and 131. Appropriate closures for ducts 2 and 3 are provided.

Figure 5:
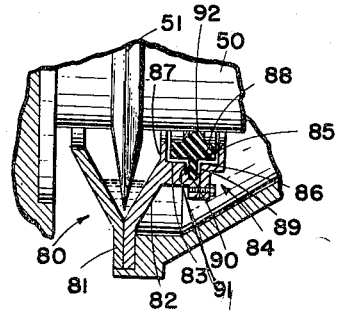
Fig. 5 is a view of a modified form of the centrifugal valve.

In Fig. 5 is shown a detail of the channel and friction contact members in a modified form of the invention. The stationary tubing 50 and flange 51 are as in Fig. 2. The channel unit 80 however differs in that only a single static seal element is used and also the seal element itself is differently constructed. The unit 80 is formed of two annular divergent plates 81 and 82. Plate 81 is terminated short of tubing 50 at a point adequate for proper channel depth under static conditions. Plate 82 terminates in an axially offset shoulder 83, to which the static seal 84 is attached. This seal consists of an annular plunger 85 formed of a resilient material, and a retaining circular receptacle 86. The receptacle is provided with a retaining wall 87 in which the plunger head 88 is adapted for movement. A constricted well 89 is formed at the base of the receptacle, the well having a second terminal well 90 at the base thereof adapted to receive a resilient stem 91 projecting from the inner face of the body of the plunger head 88. The outer face of the plunger is formed as a projecting ridge 92, so that, when placed in contact with the tubing 50, an adequate static seal is provided.

The stem 91 of the plunger is firmly fixed in the second innermost well 90. Also the plunger unit 84 is attached to the terminal axial projection 83 of the channel plate 82 so that movement of the plunger 88 will be radial with reference to the shaft.

In operation, the rotation of the shaft 11 with the attached movable plunger 85 exerts a radial centrifugal pressure on the plunger which is transmitted to the stem 91. Since the stem has the cross sectional area of the terminal well 90 it expands into the free space of the larger surrounding well 89, thus permitting radial movement of the plunger head 88 into the receptacle 89 and breaking contact of the ridge with the tubing 50.

Figure 7:
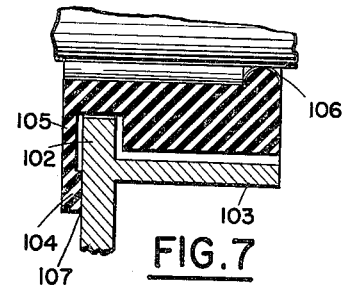
Fig. 7 is a detail of the centrifugal element of Fig. 6.
Figure 6:
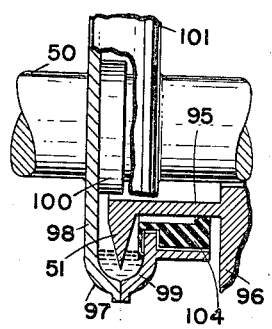
Fig. 6 is a view of another modification of the centrifugal element and liquid seal.

Figs. 6 and 7 illustrate another modification of the static seal. In this form of the invention the stationary annular flange 51 is fixed to the end of contact tube 95 concentric with shaft 50 and extending from support 96. The channel unit 97 is formed of two joined plate sections 98 and 99, the edge of section 98 having rigid connection to the shaft by connecting elements 100 and 101. Plate section 99 terminates in radial and axial flanges 102 and 103 respectively. To an annular recessed zone formed by flanges 102 and 103 on the inner face of channel plate 99 and displaced from the periphery of terminal flange 102 is positioned ring 104, of resiliently yieldable material. This ring lies in the space defined by flanges 102 and 103 but is spaced normally from both flanges and is connected to the support zone as by bonding, at 107 by a zonal disc 105 of resilient material, so that the flange 102 is displaced from the ring 104. The outer edge of the ring terminates in a bearing ridge 106 adapted to engage tube 50 under static conditions.

When the shaft is rotated the ring 104 because of centrifugal force, and the substantial mass thereof, moves outwardly to break frictional contact of ridge 106 and tubing 50. This movement is possible through the yield of the connecting disc 105, the degree of yield being determined by the stop flanges 102 and 103. By thus limiting the yield of the ring 104 the initial concentricity of the rotating mass is assured.

Figure 8:
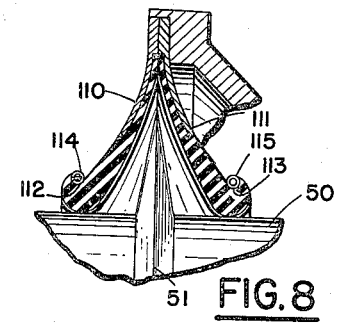
Fig. 8 is a detail of another modification of the centrifugal valve.

A third modification of the centrifugal valve is illustrated in Fig. 8. In this form the side sections 110 and 111 of the valve member are of yieldable material having cut grooves 112 and 113 adapted to receive annular coiled springs 114 and 115. The springs function to hold the yieldable channel walls 110 and 111 in liquid sealing relation to the tube 50 under static conditions. On rotation of the shaft and connected members 110 and 111 however, the springs yield to permit displacement of the wall edges from the tube 50.

Figure 9:
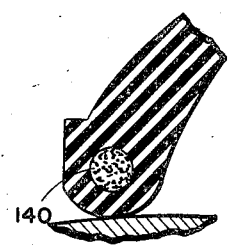
Fig. 9 is a detail illustrating special weight modification of the valve.

In certain cases it is desirable that the mass of static friction elements 65 and 66 (Fig. 2) be markedly increased so that the center of mass of these elements may be spaced axially a pronounced distance from the plane including the periphery of the flange edge 52. To accomplish this result tubular openings are formed in the contact members such as is indicated at 140 in Fig. 9 and in these openings mercury or some heavy solid is inserted. Thus the centrifugal forces acting on these elements may be readily controlled.

Mention is made of mercury and heavy oils as suitable sealing fluids. However, dependent on the specific requirements, other liquids and even certain solids and gases may be used advantageously. In the last mentioned case control of gas mixing or infiltration may be the primary objective.

It is also pointed out that the static seal, while described as of resilient material may be of nonresilient material coupled wtih spring devices. Or a combination of spring and resilient material may be employed as complementary control means for the static seal.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a shaft sealing device, a casing, a rotatable shaft within said casing, and sealing means between the shaft and casing for preventing ingress of fluid into said casing, said means comprising a rotatable member secured to said shaft for rotation therewith, said member having the shape of a channeled annulus with inwardly directed and diverging side walls, a charge of unconfined liquid mercury in said rotatable member for forming a liquid sealing ring when said member is rotated, said liquid mercury being in an amount sufficient to only partially fill the bottom portion of said rotatable member during periods of non-rotation of said shaft, a stationary member secured to said casing including an annular flange section positioned concentrically in the plane of said rotatable member with the edge thereof protruding within the cavity formed by the diverging walls of the rotatable member and into the liquid sealing ring formed on rotation of said member, said stationary member including also a valve seat on at least one side of said flange section and displaced therefrom, an elastic valve, means securing said elastic valve to said rotatable member in such a position that the major portion of said valve is permanently out of contact with said mercury, whereby said valve contacts said valve seat during periods of non-rotation of said shaft and moves from said valve seat only during periods of shaft rotation.

2. In a shaft sealing device, a casing, a rotatable shaft connected to said casing, and sealing means between the shaft and casing for prevention of liquid flow through the shaft connection, said sealing means comprising concentric cooperative elements including rotatable and fixed members each having connection to one only of said casing and shaft, said fixed member including an annular radial disc and an annular bearing surface, said rotatable member comprising a pair of circular channel sections secured together at their outer ends forming a V-shaped annular chamber, means positioning said channel sections around said annular radial disc so that said annular radial disc extends within the base of said annular chamber, a valve seat on each side of said disc, a pair of flexible rings respectively attached to adjacent innermost ends of said channel sections for engaging said valve seats, said flexible rings comprising elastic material having a center of mass axially and outwardly displaced from the point of attachment to said channel sectons, and a charge of sealing liquid in said annular chamber forming a seal ring with said disc on rotation of said shaft.

3. The combination according to claim 2 wherein the outer ends of said flexible rings have tubular openings therein, weight means in said tubular openings thereby increasing the center of mass axially from the point of attachment of said flexible rings to said channel sections.

4. The combination according to claim 2 wherein grooves are formed in the outer ends of said flexible rings, and an endless coil spring for each of said grooves, whereby said flexible rings are held in contact with said shaft during periods of non-rotation and out of contact therewith during periods of rotation of said shaft.

5. In a shaft sealing device, a casing, a rotatable shaft within said casing, and sealing means between the shaft and casing for preventing ingress of fluid into said casing, said means comprising a rotatable member secured to said shaft for rotation therewith, said member having the shape of a channeled annulus with inwardly directed and diverging side walls, a charge of unconfined sealing liquid mercury in said rotatable member for forming a liquid sealing ring when said member is rotated, said liquid mercury being in an amount sufficient to only partially fill the bottom portion of said rotatable member during periods of non-rotation of said shaft, a stationary member secured to said casing, said stationary member comprising an annular flange section positioned concentrically in the plane of said rotatable member and having the edge thereof protruding within the cavity formed by the diverging walls of said rotatable member and into the liquid sealing ring formed on rotation of said member, a valve seat on at least one side of said flange section and displaced therefrom, an elastic static seal, means securing said elastic static seal to one of said side walls and out of engagement with said sealing liquid, said static seal comprising a circular retaining receptacle on said side wall, an annular resilient plunger in said receptacle, and protruding means on said plunger for urging said plunger into engagement with said valve seat during periods of non-rotation of said shaft and out of engagement therewith during periods of shaft rotation.

6. In a shaft sealing device, a casing, a rotatable shaft within said casing, and sealing means between the shaft and casing for preventing ingress of fluid into said casing, said means comprising a rotatable member secured to said shaft for rotation therewith, said member having the shape of a channeled annulus with inwardly directed and diverging side walls, a charge of unconfined sealing liquid mercury in said rotatable member for forming a liquid sealing ring when said member is rotated, said liquid mercury being in an amount sufficient to only partially fill the bottom portion of said rotatable member during periods of non-rotation of said shaft, a stationary member secured to said casing, said stationary member comprising an annular flange section positioned concentrically in the plane of said rotatable member and having the edge thereof protruding within the cavity formed by the diverging walls of the rotatable member and into the liquid sealing ring formed on rotation of said member, a valve seat on at least one side of said flange section and displaced therefrom, an elastic static seal, means securing said elastic static seal to one of said side walls so that the major portion of said seal is out of engagement with said sealing liquid, said static seal comprising a radial and axial flange extending from one of said side walls forming a recessed zone, a ring of resiliently yieldable material in said recessed zone, and bonding means securing said ring to said radial flange, whereby the resiliently yieldable ring contacts said valve seat during periods of non-rotation of said shaft and moves out of engagement therewith during periods of shaft rotation.

JOHN W. SAWYER.

References Cited in the file of this patent

UNITED STATES PATENTS

| Number | Name | Date |
| --- | --- | --- |
| 876,313 | Wilkinson | Jan. 14, 1908 |
| 1,014,850 | Richardson | Jan. 16, 1912 |
| 2,133,879 | Thearle | Oct. 18, 1938 |
| 2,140,356 | Gutmann | Dec. 13, 1938 |
| 2,171,968 | Augustin | Sept. 5, 1939 |
| 2,407,285 | King | Sept. 10, 1946 |
| 2,461,655 | Noble | Feb. 15, 1949 |
| 2,478,649 | Wightman | Aug. 9, 1949 |